(12) United States Patent
Nagumo et al.

(10) Patent No.: US 6,959,639 B2
(45) Date of Patent: Nov. 1, 2005

(54) HYDRAULIC BOOSTER BRAKE SYSTEM

(75) Inventors: Shigeru Nagumo, Yokohama (JP);
Takashi Totsuka, Yokohama (JP);
Tomoki Hirabayashi, Yokohama (JP)

(73) Assignee: Mitsubishi Fuso Truck And Bus Corporation, Tokyo (JP)

( * ) Notice: Subject to any disclaimer, the term of this patent is extended or adjusted under 35 U.S.C. 154(b) by 17 days.

(21) Appl. No.: 10/411,091

(22) Filed: Apr. 11, 2003

(65) Prior Publication Data

US 2003/0193238 A1 Oct. 16, 2003

(30) Foreign Application Priority Data

Apr. 12, 2002 (JP) ........................................ 2002-110775
Apr. 12, 2002 (JP) ........................................ 2002-110776

(51) Int. Cl.$^7$ .............................................. F15B 13/06
(52) U.S. Cl. ...................................................... 91/516
(58) Field of Search ........................................... 91/516

(56) References Cited

U.S. PATENT DOCUMENTS 3,561,327 A * 2/1971 Stremple ..................... 91/516
3,841,095 A * 10/1974 Baker ........................... 91/516
5,398,594 A * 3/1995 Tischer et al. ................ 91/516

FOREIGN PATENT DOCUMENTS

JP          10-167090 A      6/1998

OTHER PUBLICATIONS

USA Standard, "Graphical Symbola for Fluid Power Diagragms" P1, 14 (having no copyright, given to the examiner on Jun. 1, 1990).*

* cited by examiner

Primary Examiner—F. Daniel Lopez
(74) Attorney, Agent, or Firm—Birch, Stewart, Kolasch & Birch, LLP

(57) ABSTRACT

A hydraulic booster brake system includes a flow priority valve connected to a discharge portion of a hydraulic pump. To the flow priority valve are connected a brake booster and a power steering booster in parallel. The flow priority valve supplies a stipulated flow quantity of a hydraulic fluid in a total flow quantity of the hydraulic fluid discharged by the hydraulic pump to the brake booster by priority. A relief valve is provided between a brake port and a drain port. A valve body of the relief valve can adjust a relief pressure by turning a screw shaft for relief pressure adjustment.

1 Claim, 4 Drawing Sheets

ENGINE IN IDLING

IN BRAKING AND NON POWER-STEERING

HYDRAULIC BOOSTER BRAKE SYSTEM

CROSS-REFERENCE TO RELATED APPLICATIONS

This application is based upon and claims the benefit of priority from the prior Japanese Patent Applications No. 2002-110775, filed Apr. 12, 2002; and No. 2002-110776, filed Apr. 12, 2002, the entire contents of both of which are incorporated herein by reference.

BACKGROUND OF THE INVENTION

1. Field of the Invention

The present invention relates to a hydraulic booster brake system which energizes a leg-power of a brake pedal by utilizing a hydraulic pressure of a hydraulic pump for a power steering.

2. Description of the Related Art

In order to energize a leg-power of a brake pedal in a medium-size or small-size truck, there may be adopted a hydraulic booster brake system which actuates a brake booster by utilizing a hydraulic pressure generated by a hydraulic pump for a power steering provided in the truck.

In an example of the hydraulic booster brake system, as disclosed in Jpn. Pat. Appln. KOKAI Publication No. 10-167090 published by Japan Patent Office, the brake booster is connected in series to a hydraulic circuit for the power steering. Usually, in this brake system, the brake booster is arranged on the upstream side of a power steering booster in order to give priority to actuation of the brake booster with the great importance. That is, a brake function is first assured by priority when a hydraulic fluid discharged from the hydraulic pump is supplied to the brake booster, and the hydraulic fluid which has passed through the brake booster then flows into the power steering booster, thereby demonstrating a power steering function.

Since the brake booster is arranged on the upstream side of the power steering booster as described above, an interference between the brake function and the power steering function, which is a so-called a system interference may occur on rare occasions depending on operating conditions. Specifically, if the brake booster is actuated by operating the brake pedal when the steering operation is assisted by the power steering booster, the hydraulic fluid required for assisting the steering operation is used for the brake booster, and hence a quantity of flow to the power steering booster becomes temporarily insufficient. As a result, a power required for the steering operation is temporarily increased, and a so-called a steering shock occurs.

Thus, in the prior art, provision of, e.g., suppressing means for suppressing a quantity of flow of the hydraulic fluid flowing into a servo chamber of the brake booster avoids an excessive reduction in a quantity of fluid of the hydraulic fluid flowing into the power steering booster. However, such suppressing means can be a factor of reducing the responsibility of the actuation of the brake booster, and hence it cannot be said that this means is the best countermeasure for avoiding the system interference.

In the brake booster, in order to assure the stable brake performance, a pressure of the hydraulic fluid is set so as not to exceed a predetermined maximum working pressure. The maximum working pressure of the brake booster is set lower than the maximum working pressure of the power steering booster in order to achieve both the brake function and the power steering function. The maximum working pressure of the power steering booster is determined by a relief pressure of the hydraulic pump. If the maximum working pressure of the brake booster is equal to the maximum working pressure of the power steering, the hydraulic fluid flows from a relief valve of the hydraulic pump to a drain side with a pressure lower than the maximum working pressure of the brake booster.

In the prior art, in order to set the maximum working pressure of the brake booster, a choking amount of an inner spool which performs a servo function of the brake booster is adjusted. Further, the maximum working pressure of the brake booster is set lower than the maximum working pressure of the power steering booster.

The hydraulic fluid used in the hydraulic circuit has the viscosity. The hydraulic fluid tends to hardly flow if the viscosity is high. Since the viscosity of the hydraulic fluid varies depending on a temperature, the maximum working pressure of the brake booster varies under the influence of the viscosity of the hydraulic fluid which changes depending on a temperature.

In order to assure a quantity of flow required for the power steering booster by changing a choking amount of the inner spool with respect to irregularities of the viscosity of the hydraulic fluid, a choking amount of the inner spool must be adjusted in such a manner that the maximum working pressure of the brake booster becomes lower than the maximum working pressure of the power steering booster in all temperature ranges in which the brake system is used. On the other hand, there is a demand to set the maximum working pressure of the brake booster close to the upper limit as much as possible in order to improve the brake performance.

However, the maximum working pressure for the brake booster must be set to a value which is far lower than the maximum working pressure of the power steering booster so as not to exceed the maximum working pressure of the power steering booster in all temperature ranges of the hydraulic fluid. Furthermore, since there is a demand to cause a stipulated quantity of the hydraulic fluid to flow into the power steering booster and the brake booster, it is difficult to increase the maximum working pressure of the brake booster.

BRIEF SUMMARY OF THE INVENTION

It is, therefore, an object of the present invention to provide a hydraulic booster brake system which can supply a hydraulic fluid to both a brake booster and a power steering booster. It is another object of the present invention to provide a hydraulic booster brake system which can set a maximum working pressure of a brake booster without being subject to a restriction in temperature of a hydraulic fluid.

A hydraulic booster brake system according to the present invention includes a hydraulic circuit to which a brake booster and a power steering booster are connected in parallel through distributing means on the downstream side of a hydraulic pump. With this hydraulic circuit, the brake booster and the power steering booster can independently assure a stipulated quantity of flow. Further, the responsibility of the brake booster is not lowered.

In a preferred mode according to the present invention, as the distributing means, there is adopted a flow priority valve which supplies the hydraulic fluid for the brake booster in a total flow quantity of the hydraulic fluid discharged from the hydraulic pump to the brake booster by priority, and supplies the excessive hydraulic fluid to the power steering booster.

Adoption of the flow priority valve enables a stipulated flow quantity of the hydraulic fluid to be constantly supplied to the brake booster with the great importance even if a discharge amount of the hydraulic pump varies.

In the preferred mode according to the present invention, as an example of the flow priority valve, there is employed a spool valve which can distribute a stipulated quantity of flow with a simple structure. For example, a cylinder of the spool valve has a first port communicating with a discharge side of the hydraulic pump, a second port communicating with an inlet side of the power steering booster, and a third port communicating with an inlet side of the brake booster. The spool is accommodated in the cylinder so as to be capable of moving in the axial direction of the cylinder. The spool is pressed in one direction by an urging member, and has a receiving port which receives a pressure of the hydraulic fluid flowing therein from the first port. The spool valve has an orifice through which the hydraulic fluid from the receiving port passes, a brake booster passage which leads the hydraulic fluid passing through the orifice to the third port, a power steering passage which leads the excessive hydraulic fluid which does not pass through the orifice to the second port from the upstream side of the orifice through a part between an outer peripheral surface of the spool and an inner surface of the cylinder, a first choke portion which is formed in the brake booster passage and narrows this passage by using the spool which moves when a pressure of the power steering booster is increased, and a second choke portion which is formed in the power steering passage and narrows this passage by using the spool which moves when a pressure of the brake booster is increased. According to this structure, the first and second choke portions are controlled by the spool which moves in accordance with pressures of the power steering booster and the brake booster, and leakage of the hydraulic fluid from a side with a high pressure to a side with a low pressure can be suppressed. As a result, a stipulated quantity of flow is assured in the brake booster by priority through the third port, and the excessive hydraulic fluid is distributed to the power steering booster through the second port.

In the preferred mode according to the present invention, the spool valve includes a by-pass port which can be connected to the drain side of the power steering hydraulic circuit, and a gate portion formed between the spool and the cylinder. The gate portion causes the second port to communicate with the by-pass port when the spool is at an initial position, and disconnects the second port and the by-pass port when the spool moves in the axial direction. According to this structure, even if the hydraulic pump generates a discharge failure, the hydraulic fluid is allowed to flow into the power steering booster.

In a hydraulic booster brake system according to the present invention based on another aspect, a relief valve capable of adjusting a relief pressure is provided between an inlet side of the brake booster and a drain side of the power steering hydraulic circuit. Adjusting the relief pressure of the relief valve can set a maximum working pressure of the brake booster.

According to this structure, when the brake booster reaches the maximum working pressure, the relief valve is opened. Therefore, the hydraulic fluid can be supplied to the brake booster and the power steering booster, whilst the excessive pressure can be passed to the drain side. As described above, with the structure that the maximum working pressure of the brake booster is set in accordance with the relief pressure of the relief valve, it is possible to suppress irregularities in maximum working pressure due to a temperature or the like of the hydraulic fluid. Further, a stipulated quantity of flow can be assured in each of the brake booster and the power steering booster, and the maximum working pressure of the brake booster can be set to a high value close to the maximum working pressure of the power steering booster.

Therefore, the maximum working pressure of the brake booster can be increased, thereby improving the brake performance. Furthermore, the hydraulic fluid is supplied to the brake booster with the great importance by priority.

In this preferred mode according to the present invention, the maximum working pressure of the brake booster is set lower than the maximum working pressure of the power steering booster.

The preferred mode of the relief valve includes a valve chest which has an inlet port communicating with a passage on the downstream side from the first choke portion and an output port communicating with the drain side of the power steering hydraulic circuit. Moreover, this relief valve includes a valve body which moves to a position at which the inlet port is caused to communicate with the outlet port when an excessive pressure is applied from the inlet port, an urging member which presses the valve body in a closing direction, and a relief pressure adjusting member which adjusts an urging force of the urging member. This relief valve has a simple structure, but can smoothly move and set the maximum working pressure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A hydraulic booster brake system S1 according to an embodiment of the present invention will now be described hereinafter with reference to FIGS. 1 to 6.

Figure 1:
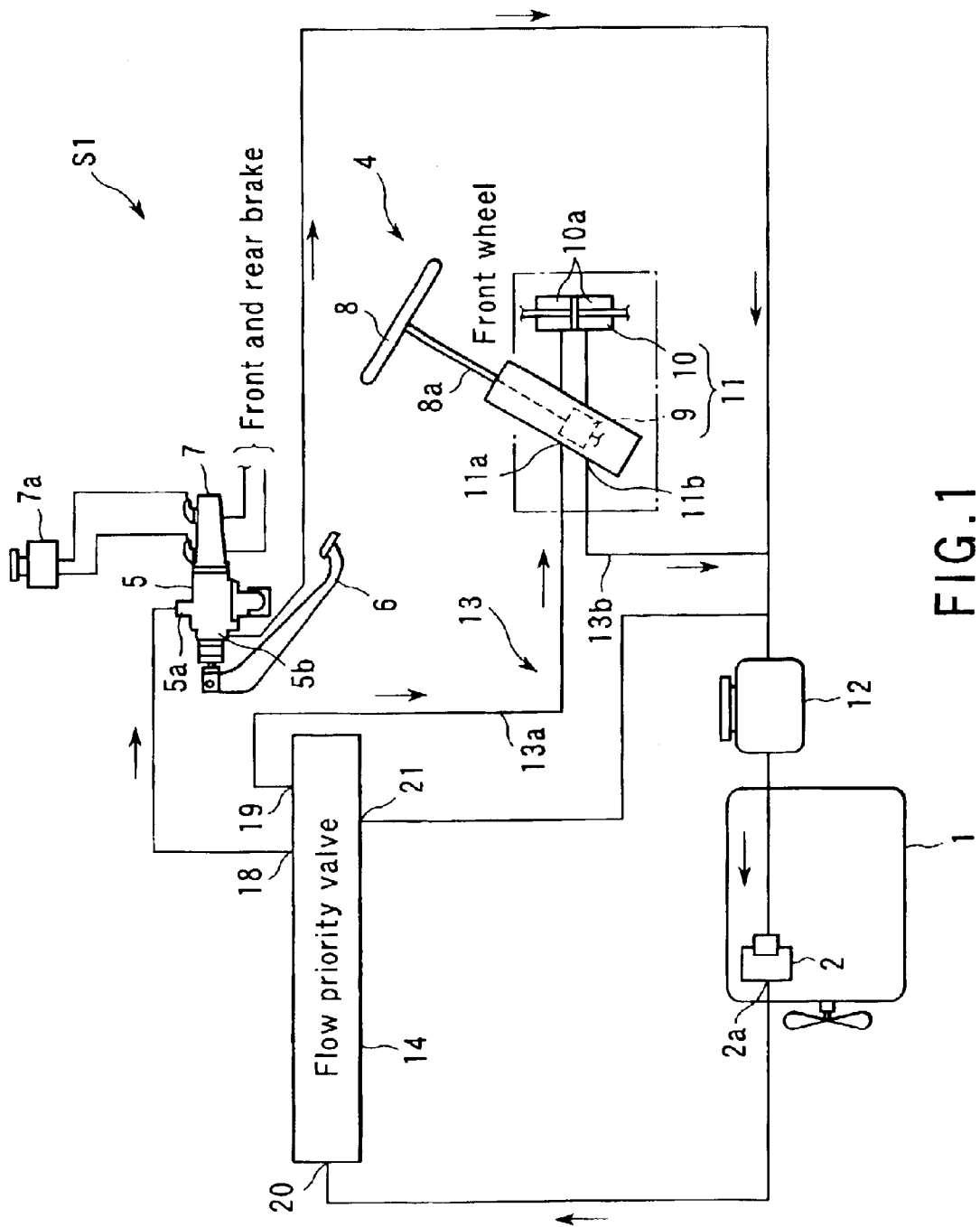
FIG. 1 is a side view showing an outline of a hydraulic booster brake system according to an embodiment of the present invention.

As shown in FIG. 1, a power steering hydraulic pump (which will be simply referred to as a hydraulic pump hereinafter) 2 is driven by a car driving engine 1. An example of the hydraulic pump is an oil pump. This car includes a power steering 4. To an input portion of a brake booster 5 is connected a master cylinder 7 driven by a brake pedal 6. A brake reserve tank 7a is provided to the master cylinder 7.

A power steering booster 11 of the power steering 4 includes a rotary valve 9 which functions as a control valve, and a power cylinder 10 connected to front wheels (not shown). The rotary valve 9 is provided to a steering shaft 8a of a steering wheel used to steer the front wheels. The power cylinder 10 communicates with a pair of hydraulic pressure outlet/inlet ports of the rotary valve 9.

A discharge portion 2a of the hydraulic pump 2 is connected to a reserve tank 12 through a flow priority valve 14, a supply pipe 13a, an inlet portion 11a and an outlet portion 11b of the rotary valve 9, a return pipe 13b and the like. The reserve tank 12 is provided on the inlet side of the hydraulic pump 2. When the steering wheel 8 is used for steering, a hydraulic fluid discharged from the hydraulic pump 2 is led to a cylinder chamber 10a of the power cylinder 10 via the rotary valve 9, and the steering power is thereby assisted. The power steering booster 11, the supply pipe 13a, the return pipe 13b and the like constitute a power steering hydraulic circuit 13. An oil is used for the hydraulic fluid.

The brake booster 5 is connected in parallel to the power steering booster 11. Specifically, an inlet portion 5a of the brake booster 5 is connected to a discharge side of the hydraulic pump 2 via the flow priority valve 14, and an outlet portion 5b of the same is connected to the inlet side of the reserve tank 12. The hydraulic fluid discharged from the hydraulic pump 2 is supplied to the brake booster 5 and the power steering booster 11 through the flow priority valve 14.

The flow priority valve 14 is connected to the inlet portion 5a of the brake booster 5 and the inlet portion 11a of the power steering booster 11. The flow priority valve 14 has a function to distribute a stipulated flow quantity of the hydraulic fluid discharged from the hydraulic pump 2 to each of the brake booster 5 and the power steering booster 11. Such a spool valve 15 as shown in FIG. 2 is used for the flow priority valve 14.

The spool valve 15 includes a housing 16 consisting of a metal block. To this housing 16 is formed a pump port 20 as a first port, a power steering port 19 as a second port, and a brake port 18 as a third port from the right side in FIG. 2. A drain port 21 serving as a by-pass port is formed at a part of the housing 16.

Of the respective ports 18 to 21, the brake port 18 communicates with the inlet portion 5a of the brake booster 5. The power steering port 19 communicates with the inlet portion 11a of the power steering booster 11. The pump port 20 communicates with the discharge portion 2a of the hydraulic pump 2. The drain port 21 communicates with the inlet side of the reserve tank 12.

Figure 2:
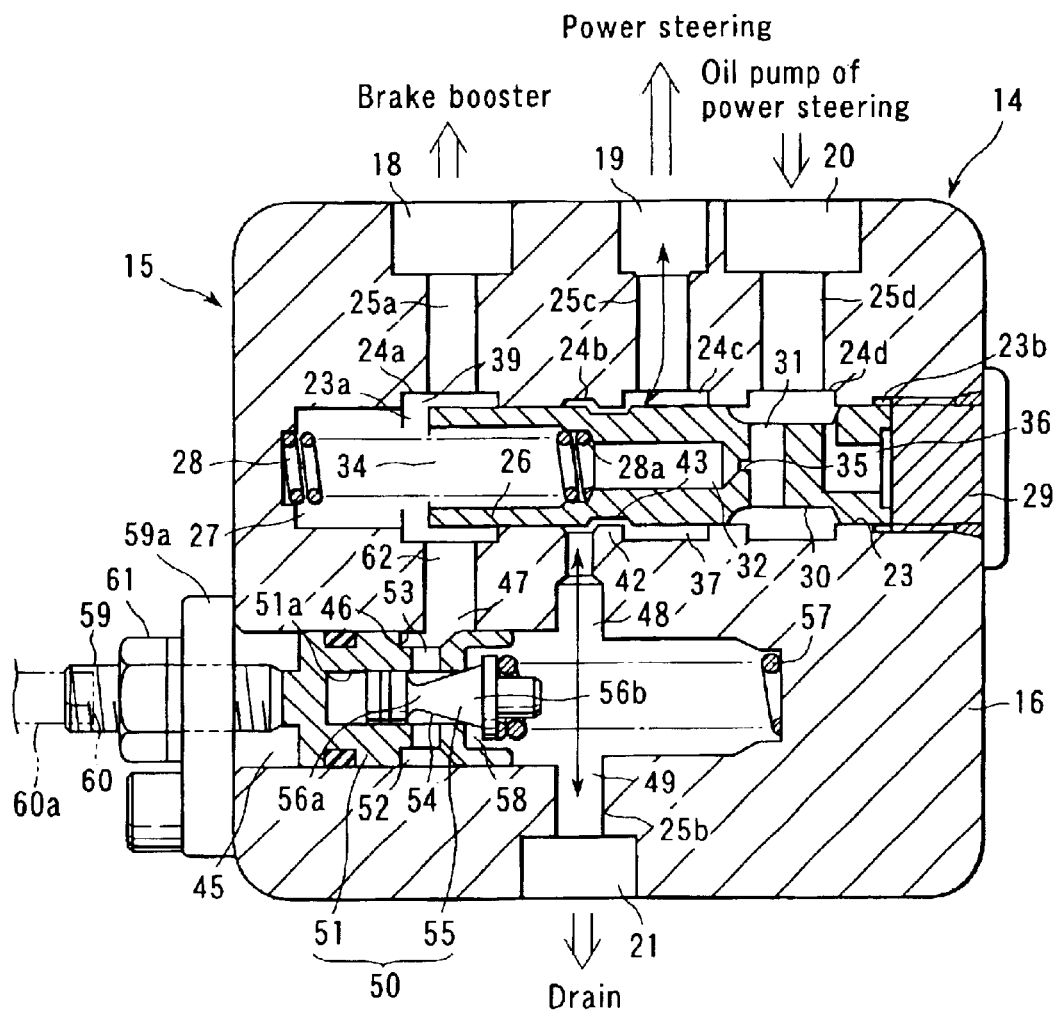
FIG. 2 is a cross-sectional view showing a flow priority valve of the hydraulic booster brake system shown in FIG. 1 together with a direction in which a hydraulic fluid flows when an engine is stopped.

In the housing 16 is formed a hollow cylinder 23 which is an elongated space extending from the right surface in FIG. 2 to the left side so as to pass through the lower parts of the respective ports 18 to 20. On the inner peripheral surface of the cylinder 23 are formed a first annular groove 24a, a second annular groove 24b, a third annular groove 24c and a fourth annular groove 24d at predetermined intervals from the left side in FIG. 2. A width of the second annular groove 24b is smaller than widths of other annular grooves 24a, 24c and 24d.

The first annular groove 24a communicates with the brake port 18 through a first through hole 25a. The second annular groove 24b communicates with the drain port 21 through a second through hole 25b. The third annular groove 24c communicates with the power steering port 19 through a third through hole 25c. The fourth annular groove 24d communicates with a pump port 20 through a fourth through hole 25d.

A spool 26 is accommodated in the cylinder 23 so as to be capable of moving in the axial direction of the cylinder 23. The spool 26 is pressed in the right direction in FIG. 2 by a coil spring 28 which is an example of an urging member. The coil spring 28 is accommodated being compressed in a spring chamber 27 which is continuous to the left end of the cylinder 23. A tap member 29 is screwed in at the right end of the cylinder 23. The spool 26 is pressed against the end surface of the tap member 29 by the coil spring 28. This state is an initial position of the spool 26.

An outside diameter of the spool 26 is slightly smaller than an inside diameter of the cylinder 23. A length of the spool 26 is shorter than a length of the cylinder 23. An annular notch portion 30 having a width substantially the same as that of the fourth annular groove 24d is formed at a part of the outer peripheral surface of the spool 26 which is opposed to the fourth annular groove 24d. A receiving port 31 which receives a pressure of the hydraulic fluid from the hydraulic pump 2 is opened on the inner surface of the notch portion 30.

In the spool 26 is formed a through hole 32 whose left end is opened on the left end surface of the spool 26 and whose right end communicates with the receiving port 31. The coil spring 28 is inserted into this through hole 32. A step portion 28a which receives an end of the coil spring 28 is formed at a part of the inner peripheral surface of the through hole 32.

The first annular groove 24a faces a first chamber 23a formed at one end of the cylinder 23. The hydraulic fluid which has flowed into the receiving port 31 flows into the brake port 18 via a through hole 32, gaps of a wire of the coil spring 28, the first chamber 23a and the first annular groove 24a. That is, there is formed a booster passage 34 which runs from the receiving port 31 to the brake port 18 through the inside of the spool 26.

To the inlet portion of the through hole 32 is formed an orifice 35 which restricts a quantity of flow of the hydraulic fluid flowing toward the brake port 18. Of a total quantity of flow of the hydraulic fluid which has flowed into the receiving port 31, a quantity of flow passing through the orifice 35 is a stipulated quantity of flow to the brake booster 5. The excessive hydraulic fluid which does not pass through the orifice 35 is distributed to the power steering 4. That is, the choking effect of the orifice 35 causes a stipulated flow quantity of the hydraulic fluid to be supplied to the brake booster 5 by priority, and causes the excessive hydraulic fluid to be distributed to the power steering 4.

At the right end of the spool 26 in FIG. 2 is formed a through hole 36. A second chamber 23b is formed at the right end of the cylinder 23. The hydraulic fluid which has been fed to the notch portion 30 from the hydraulic pump 2 through the fourth through hole 25d is led to the second chamber 23b via the through hole 36. When the pressure of the hydraulic pump 2 acts on the second chamber 23b in this manner, the thrust to push the spool 26 toward the spring 28 is generated.

Figure 3:
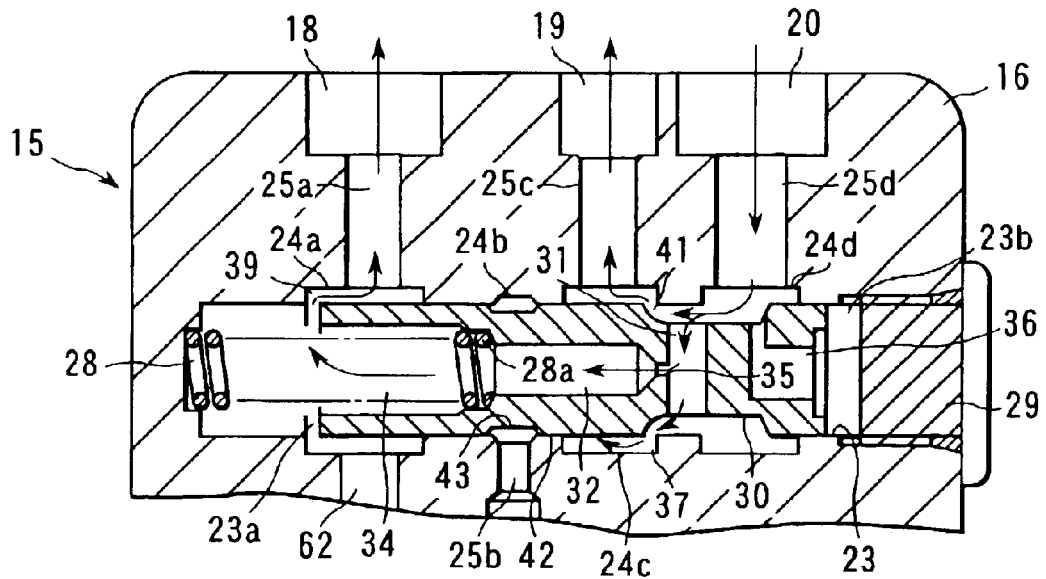
FIG. 3 is a cross-sectional view showing a part of the flow priority valve shown in FIG. 2 together with a direction in which the hydraulic fluid flows when the engine rotates.

When the pressure of the hydraulic fluid discharged from the hydraulic pump 2 is applied to the notch portion 30, the spool 26 moves from the initial position shown in FIG. 2 to a position depicted in FIG. 3. As a result, the third annular groove 24c communicates with the fourth annular groove 24d through the notch portion 30. Therefore, the excessive hydraulic fluid which does not pas through the orifice 35 flows into the power steering port 19 via the notch portion 30 and the third annular groove 24c. The annular grooves 24c and 24d and the through holes 25c and 25d constitute a power steering passage 37 used to lead the hydraulic fluid from the receiving port 31 to the power steering port 19.

A first choke portion 39 is formed to the brake booster passage 34. The first choke portion 39 is formed between the left end of the spool 26 and the annular groove 24a. When the power steering 4 is used, a hydraulic pressure of the steering booster 11 is increased, and the pressure applied to the notch portion 30 becomes high. Then, the spool 26 moves in the left direction, and a passage cross section of the first choke portion 39 becomes thereby small.

To the power steering passage 37 is formed a second choke portion 41 between the third annular groove 24c and the left end of the notch portion 30 as shown in FIGS. 3 to 6. When the brake pedal 6 is operated, the hydraulic pressure of the brake booster 5 is increased, and the pressure applied to the left end surface of the spool 26 becomes high. Then, the spool 26 moves in the right direction, and a passage cross section of the second choke portion 41 becomes thereby small.

As described above, the passage cross section of each of the choke portions 39 and 41 is controlled by the spool 26 which moves in accordance with a change in pressure of the power steering 4 and the brake booster 5. That is, the control over a quantity of flow (choking effect) by the choke portions 39 and 40 suppresses leakage of the hydraulic fluid from a side with a high pressure to a side with a low pressure. Therefore, a stipulated flow quantity of the hydraulic fluid is distributed to each of the brake port 18 and the power steering port 19 irrespective of use of the power steering 4 or the brake pedal 6.

A land 42 is formed between the second annular groove 24b and the third annular groove 24c. An annular notch portion 43 which functions as a gate portion is formed on the outer peripheral surface of the spool 26 opposed to the land 42. When the spool 26 is set at the initial position shown in FIG. 2, the second annular groove 24b communicates with the third annular groove 24c through the notch portion 43. When the spool 26 moves from the initial position to the left side as shown in FIGS. 3 to 6, the second annular groove 24b and the third annular groove 24c are disconnected by the land 42. That is, the inlet side of the power steering booster 11 is caused to communicate with the drain port 21 by the notch portion 43 only when the spool 26 is set at the initial position.

As shown in FIG. 2, a relief valve 45 is provided below the spool valve 15. The relief value 45 has an elongated cylindrical valve chamber 46. This valve chamber 46 extends in the right direction through the lower part of the cylinder 23 from the left surface of the housing 16. An inlet port 47 is formed at the upper part of the valve chamber 46. A relay port 48 and an outlet port 49 are formed on the right side of the valve chamber 46. The relay port 48 and the outlet port 49 communicate with the second through hole 25b.

A valve module 50 is accommodated on the left side of the valve chamber 46 shown in FIG. 2 so as to be capable of moving in the axial direction of the valve chamber 46. The left end of the valve housing 51 of the valve module 50 is closed. The right side of the valve housing 51 is opened, and a valve hole 58 is formed thereto. An annular groove 52 which extends along the circumferential direction is formed on the outer peripheral surface of the valve housing 51. A through hole 53 communicating with a hole 51a on the inner side of the valve housing 51 is formed on the inner surface of the annular groove 52. A rod-shaped valve body 55 is inserted into the valve housing 51 so as to be capable of moving in the axial direction of the valve housing 51.

An opening/closing portion 54 is formed at an intermediate portion of the valve body 55 in the axial direction. On the left side of the opening/closing portion 54 is formed a small-diameter portion 56a whose diameter is smaller than that of the hole 51a of the valve housing 51. On the right side of the opening/closing portion 54 is formed a conical large-diameter portion 56b having a part with a larger diameter than that of the hole 51a. This valve body 55 is pressed in the left direction by a coil spring 57 provided on the right side of the valve chamber 46. The coil spring 57 functions as an urging member. With this coil spring 57, the large-diameter portion 56b of the opening/closing portion 54 closes a valve hole 58. That is, the valve body 55 is constantly pressed in a direction to disconnect the inlet port 47 and the outlet port 49.

An end of a screw shaft 59 which functions as a relief pressure adjusting member is in contact with a left end surface of the valve housing 51. This screw shaft 59 is screwed in a fixed plate 59a attached to the housing 16, and protrudes toward the inside of the housing 16. A passage whose passage cross section varies in accordance with a position of the screw shaft 59 in the axial direction is formed between the inlet port 47 and the annular groove 52. In FIG. 2, when the screw shaft 59 is moved to the right or left side, the passage cross section between the annular groove 52 and the inlet port 47 varies while maintaining the communication state of the annular groove 52 of the valve module 50 and the inlet port 47.

A hole 60 into which a tool 60a (which is partially shown in FIG. 2) such as a rod wrench can be inserted is formed on the outer end surface of the screw shaft 59. By rotating the screw shaft 59 in the clockwise direction or counterclockwise direction by using the tool 60a inserted into the hole 60, the valve module 50 can be moved to the right or left side. Since a quantity of compression of the coil spring 57 varies when the valve module 50 is moved in the axial direction, the power used to close the valve body 55, i.e., the relief pressure can be adjusted. The screw shaft 59 is fixed by a lock nut 61. This lock nut 61 can prevent the relief pressure from being shifted.

Figure 6:
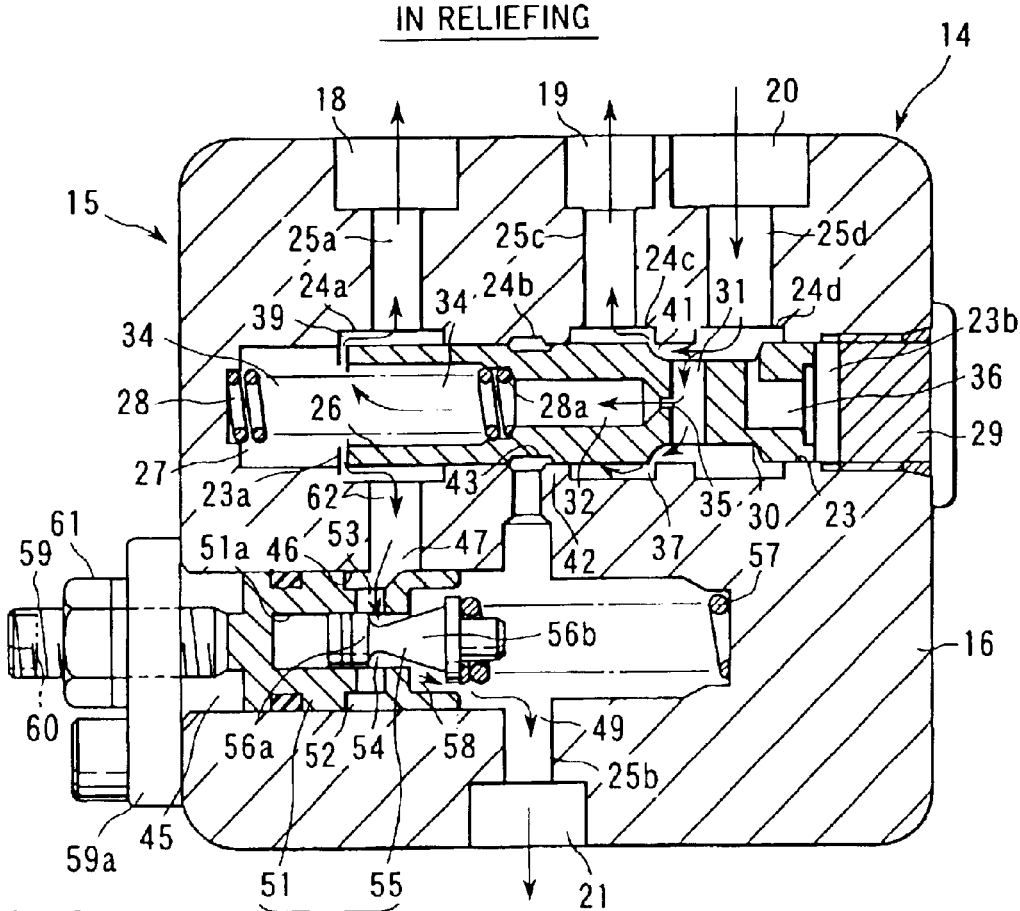
FIG. 6 is a cross-sectional view showing the flow priority valve shown in FIG. 2 together with a direction in which the hydraulic fluid flows when a relief valve is opened.

The inlet port 47 of the valve chamber 46 communicates with the brake port 18 through the through hole 62 and the first choke portion 39. The brake booster passage formed between the brake port 18 and the first choke portion 39 includes the first annular groove 24a. When the excessive pressure exceeding a set relief pressure is applied to the valve body 55 from the inlet port 47, the opening/closing portion 54 opens as shown in FIG. 6. When the opening/closing portion 54 opens, the pressure applied to the inlet port 47 is passed to the drain port 21. Therefore, setting the relief pressure by using the screw shaft 59 can adjust the maximum working pressure of the brake booster 5. Further, the maximum working pressure of the brake booster 5 can be set to a pressure lower than the maximum working pressure of the power steering booster 11. The maximum working pressure of the brake booster 5 is set to a value close to the maximum working pressure of the power steering booster 11. The maximum working pressure of the power steering booster 11 corresponds to the relief pressure of the hydraulic pump 2.

Description will now be given as to a function of the hydraulic booster brake system S1 according to this embodiment.

When the engine 1 of a car is stopped, the hydraulic pump 2 is stopped. Therefore, as shown in FIG. 2, the spool 26 of the flow priority valve 14 is pressed against the tap member 29 by an impetus of the coil spring 28.

When the engine 1 starts, the hydraulic pump 2 is driven. Therefore, the hydraulic fluid in the reserve tank 12 is supplied toward the flow priority valve 14 from the discharge portion 2a of the hydraulic pump 2 as indicated by arrows in FIG. 1. This hydraulic fluid enters the receiving port 31 of the spool 26 through the pump port 20 of the flow priority valve 14, the fourth annular groove 24d, and the notch portion 30 of the spool 26.

At this moment, the receiving port 31 communicates with the orifice 35. Thus, as shown in FIG. 3, the hydraulic fluid in the receiving port 31 flows through the through hole 32 via the orifice 35. Of a total quantity of flow of the hydraulic pump 2, a stipulated quantity of flow used by the brake booster 5 is distributed to the brake booster 5 by priority by the choking effect of the orifice 35. That is, the hydraulic fluid which has passed through the first choke portion 39 is supplied to the brake booster 5 from the brake port 18 via the first annular groove 24a.

When the pressure of the hydraulic fluid in the notch portion 30 increases, the spool 26 moves from the initial position to the left side as shown in FIG. 3. As a result, the third annular groove 24c communicates with the notch portion 30. Accordingly, the hydraulic fluid in the notch portion 30 is supplied to the rotary valve 9 of the power steering 4 through the notch portion 30, the second choke portion 41, the third annular groove 24c and the power steering port 19. That is, the excessive hydraulic fluid which does not pass through the orifice 35 is distributed to the power steering booster 11. The spool 26 stops at a position where a differential pressure between the upstream side and the downstream side of the orifice 35 is balanced. The above-described distribution state, i.e., the distribution state when the engine 1 rotates and the steering wheel 8 and the brake pedal 6 are not operated is the same as that when the number of rotation of the engine 1 is increased as well as when the engine 1 is in the idling state.

Figure 4:
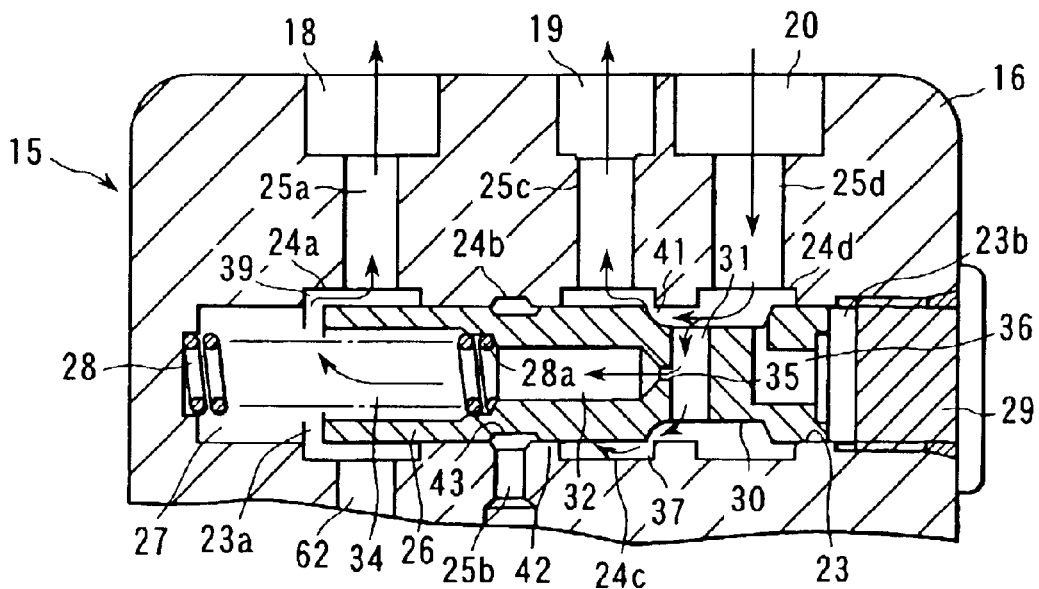
FIG. 4 is a cross-sectional view showing a part of the flow priority valve shown in FIG. 2 together with a direction in which the hydraulic fluid flows when a brake booster is active and a power steering booster is not active.

Here, there is assumed a state that the brake pedal 6 is used and the steering wheel 8 is not operated. When the brake pedal 6 is used, the hydraulic fluid flows into a servo chamber (not shown) of the brake booster 5, thereby reducing the leg-power of the brake pedal 6. At this moment, the pressure of the hydraulic fluid of the brake booster 5 is increased. That is, the hydraulic pressure of the brake booster 5 becomes higher than the hydraulic pressure of the power steering booster 11. In this case, as shown in FIG. 4, the pressure on the left side of the spool 26 is increased, and the spool 26 thereby moves to the right side. Also, the passage cross section of the second choke portion 41 is decreased. This spool 26 stops at a position where a differential pressure between the upstream side and the downstream side of the orifice 35 is balanced.

When the passage cross section of the second choke portion 41 is decreased as described above, the hydraulic fluid on the brake booster 5 side with a high pressure can be suppressed from flowing into the power steering booster 11 with a low pressure. That is, the hydraulic fluid which should flow toward the brake booster 5 can be prevented from flowing into the third annular groove 24c. As a result, a stipulated quantity of the hydraulic fluid continues flowing toward the brake booster 5. Furthermore, a part of the hydraulic fluid keeps being distributed to the power steering booster 11. When a discharge amount of the hydraulic pump 2 fluctuates, e.g., decreases, a quantity of flow of the hydraulic fluid for the power steering which does not pass through the orifice 35 is reduced. However, a fixed quantity of flow of the hydraulic fluid for the brake booster which passes through the orifice 35 can be assured.

On the other hand, there is assumed a state that the steering wheel 8 is operated and the brake pedal 6 is not used. When the steering wheel 8 is operated, the hydraulic fluid is supplied to the cylinder chamber 10a of the power cylinder 10 from the rotary valve 9 of the power steering booster 11, the operation power of the steering wheel 8 is assisted. In this case, the pressure of the hydraulic fluid of the power steering booster 11 is increased.

Figure 5:
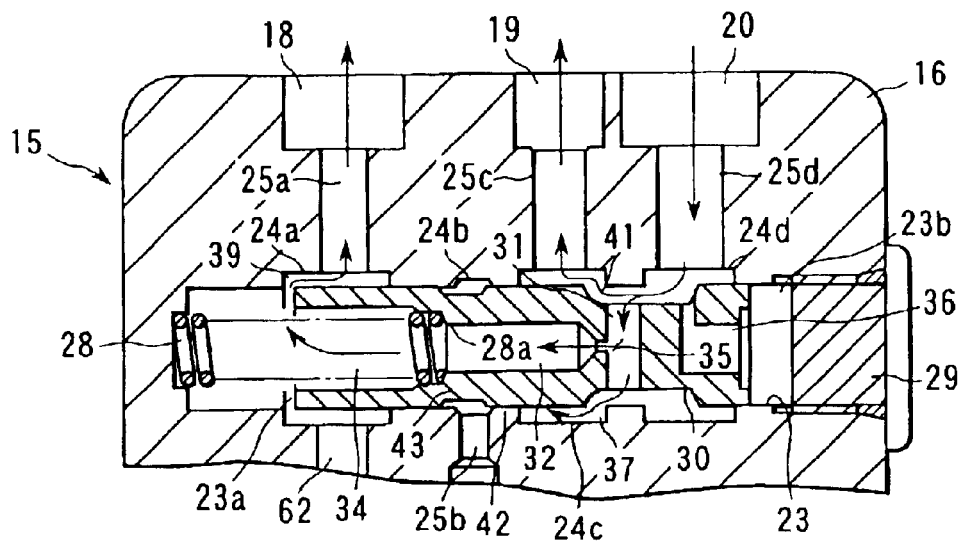
FIG. 5 is a cross-sectional view showing a part of the flow priority valve shown in FIG. 2 together with a direction in which the hydraulic fluid flows when the brake booster is not active and the power steering booster is active.

That is, the hydraulic pressure of the power steering booster 11 becomes higher than that of the brake booster 5. Therefore, as shown in FIG. 5, an increase in pressure applied to the notch portion 30 of the spool 26 causes the spool 26 to move to the left side, and the passage cross section of the first choke portion 39 is reduced. The spool 26 stops at a position where a differential pressure between the upstream side and the downstream side of the orifice 35 is balanced.

A reduction in passage cross section of the first choke portion 39 can suppress the hydraulic fluid on the power steering booster 11 side with a high pressure from flowing to the brake booster 5 with a low pressure. That is, the hydraulic fluid which should flow toward the power steering booster 11 can be restrained from flowing into the first annular groove 24a. As a result, a stipulated quantity of the hydraulic fluid continues flowing through the brake booster 5 and the power steering booster 11.

When the brake pedal 6 and the steering wheel 8 are simultaneously operated, the spool 26 receives both the increasing brake hydraulic pressure and the increasing power steering hydraulic pressure. In this case, the spool 26 likewise stops at a position where a differential pressure between the upstream side and the downstream side of the orifice 35 is balanced as shown in FIG. 3. In such a case, the hydraulic fluid is likewise restricted from leaking from a side with a high pressure to a side with a low pressure by the choke portions 39 and 41, and a stipulated quantity of the hydraulic fluid is thereby distributed to each of the brake booster 5 and the power steering booster 11.

When a discharge amount of the hydraulic pomp 2 fluctuates, e.g., decreases, a quantity of flow of the hydraulic liquid for the power steering which does not pass through the orifice 35 is reduced. However, a fixed quantity of flow of the hydraulic fluid for the brake booster which passes through the orifice 35 is assured by priority.

As described above, a stipulated quantity of flow is always assured for each of the brake booster 5 and the power steering booster 11 even if the pressure relationship of their hydraulic fluid varies, and the system interference of the respective boosters 5 and 11 can be prevented from being generated. It is possible to avoid generation of, e.g., the steering shock caused when the power steering booster 11 lacks an enough quantity of flow.

In addition, since the responsibility of the brake booster 5 is not deteriorated, both the excellent power steering performance and brake performance can be achieved. The flow priority valve 14 supplies a stipulated quantity of flow of the hydraulic fluid to the brake booster 5 with the great importance by priority, and distributes the excessive hydraulic fluid to the power steering booster 11. Therefore, even if a discharge amount of the hydraulic pump 2 fluctuates, the brake performance is not deteriorated.

The flow priority valve 14 has the brake booster passage 34 in the spool 26, and the power steering passage 37 between the spool 26 and the cylinder 23. Since the choke portions 39 and 41 are formed to these passages 34 and 37, the flow priority valve 14 can be smoothly actuated with a simple structure. Therefore, the flow priority valve 14 can assuredly perform distribution of the hydraulic fluid.

When the brake booster 5 reaches the maximum working pressure, the valve body 55 of the relief valve 45 moves in the right direction against the coil spring 57 by the pressure applied to the opening/closing portion 54 as shown in FIG. 6. As a result, the valve hole 58 opens. Therefore, a part of the hydraulic fluid moving toward the brake booster 5 flows from the drain port 21 to the reserve tank 12 through the valve chamber 46, the valve hole 58 and the outlet port 49. As a result, the excessive pressure is passed. At this moment, the power steering booster 11 is yet to reach the relief pressure of the hydraulic pump 2 corresponding to the maximum working pressure. That is, the maximum working pressure of the power steering booster 11 is constantly higher than the maximum working pressure of the brake booster 5. Therefore, even if the brake booster 5 reaches the maximum working pressure, a stipulated quantity of flow is assured for the power steering booster 11.

In this embodiment, the maximum working pressure of the brake booster 5 is set in accordance with the relief pressure of the relief valve 45. Therefore, the maximum working pressure of the brake booster 5 can be set without being dependent on a temperature of the hydraulic fluid, and the maximum working pressure can be prevented from greatly varying by the influence of the temperature. The maximum working pressure of the brake booster 5 can be arbitrarily set by rotating the screw shaft 59 and adjusting the relief pressure of the relief valve 45. That is, the maximum working pressure of the brake booster 5 can be approximated to a value close to the maximum working pressure of the power steering booster 11. Therefore, the maximum working pressure of the brake booster 5 can be set to a higher value, thereby improving the brake performance.

The flow priority valve 14 supplies a stipulated quantity of the hydraulic fluid to the brake booster 5 by priority, and distributes the excessive fluid to the power steering booster 11. Thus, even if the relief valve of the hydraulic pump 2 opens when the power steering booster 11 reaches the maximum working pressure, a stipulated quantity of flow of the hydraulic fluid can be kept being supplied to the brake booster 5. That is, as shown in FIG. 5, when the spool 26 moves in the left direction, a stipulated quantity of flow is assured for the brake booster 5. Thus, even if the relief value of the hydraulic pump 2 opens, the brake performance is not deteriorated.

Since the flow priority valve 14 can adjust the relief pressure by turning the screw shaft 59, it can smoothly operate with a simple structure. Therefore, the flow priority valve 14 can accurately perform distribution of the hydraulic fluid and setting of the relief pressure.

When the spool 26 of the flow priority valve 14 is in the initial position shown in FIG. 2 (when the engine stops), the power steering port 19 and the drain port 21 communicate with each other through the notch portion 43 which functions as a gate portion. When the engine 1 rotates and the spool 26 moves to the left side from the initial position, the power steering port 19 and the drain port 21 are disconnected.

Therefore, even if the hydraulic fluid is not discharged from the hydraulic pump 2 for some reason and the spool 26 returns to the initial position during, e.g., traveling of a car, the power steering port 19 and the drain port 21 communicate with each other. That is, even when the hydraulic pump 2 reaches a control flow quantity or below, a defect that the steering wheel 8 is locked does not occur.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A hydraulic booster brake system comprising:
   a power steering hydraulic circuit including a power steering booster provided on the downstream side of a hydraulic pump;
   a brake booster connected in parallel with the power steering booster on the downstream side of the hydraulic pump, said brake booster receiving a stipulated quantity of hydraulic fluid discharged from the hydraulic pump;
   a distributing mechanism connected to a discharge portion of the hydraulic pump, said distributing mechanism supplying the stipulated quantity of hydraulic fluid to the brake booster, and supplying a remaining portion of the quantity of the hydraulic fluid to the power steering booster;
   wherein the distributing mechanism is a flow priority valve including a spool valve supplying the hydraulic fluid in a total flow quantity of the hydraulic fluid discharged from the hydraulic pump to the brake booster by priority, the spool valve comprising
   a hollow cylinder which has a first port communicating with the discharge portion of the hydraulic pump, a second port communicating with the power steering booster, and a third port communicating with the brake booster;
   a spool which is accommodated in the cylinder while being pressed by an urging member so as to be capable of moving in an axial direction of the cylinder, and has a receiving port which receives a pressure of the hydraulic fluid flowing into the first port;
   a brake booster passage which includes an orifice through which the hydraulic fluid from the receiving port passes, and leads a stipulated flow quantity of the hydraulic fluid passing through the orifice to the third port;
   a power steering passage which leads the excessive hydraulic fluid which does not pass through the orifice to the second port via a space between the spool and the cylinder;
   a first choke portion which is formed to the brake booster passage and narrows the passage by using the spool which moves when a pressure of the power steering booster is increased;
   a second choke portion which is formed to the power steering passage and narrows the passage by using the spool which moves when a pressure of the brake booster is increased;

a by-pass port which can be connected to a drain side of the power steering hydraulic circuit; and a gate portion which is formed between the spool and an inner surface of the cylinder, causes the second port and the by-pass port to communicate with each other when the spool is in an initial position, and disconnects the second port and the by-pass port when the spool moves in the axial direction.

* * * * *